United States Patent
Dushane et al.

(12) 
(10) Patent No.: US 6,213,404 B1
(45) Date of Patent: Apr. 10, 2001

(54) REMOTE TEMPERATURE SENSING TRANSMITTING AND PROGRAMMABLE THERMOSTAT SYSTEM

(76) Inventors: Steve Dushane, 17170 Los Alimos St., Granada Hills, CA (US) 91344; Terry Zimmerman, 10810 Springfield, Northridge, CA (US) 91324; Grant Bohm, 19540 Sherman Wy., Reseda, CA (US) 91335; John Staples, 25751 Dillon, Newport Beach, CA (US) 92657

(*) Notice: Subject to any disclaimer, the term of this patent is extended or adjusted under 35 U.S.C. 154(b) by 0 days.

(21) Appl. No.: 09/270,954

(22) Filed: Mar. 17, 1999

Related U.S. Application Data

(63) Continuation-in-part of application No. 09/079,326, filed on May 14, 1998, which is a continuation-in-part of application No. 08/802,640, filed on Feb. 19, 1997, now Pat. No. 6,116,512, which is a division of application No. 08/088,767, filed on Jul. 8, 1993, now Pat. No. 5,348,078.

(51) Int. Cl.[7] .............................. G05D 23/00; G08C 19/12
(52) U.S. Cl. .............................. 236/51; 165/205; 236/94; 340/870.17
(58) Field of Search ................... 236/51, 94; 340/870.17; 165/205–1

(56) References Cited

U.S. PATENT DOCUMENTS

| 5,224,353 | * | 7/1993 | Nagasawa | ............................. 62/209 |
|---|---|---|---|---|
| 5,272,477 | * | 12/1993 | Tashima et al. | ............... 340/870.16 |
| 5,449,319 | * | 9/1995 | Dushane . | |
| 5,927,599 | * | 7/1999 | Kath | ..................................... 236/47 |

* cited by examiner

Primary Examiner—William Wayner
(74) Attorney, Agent, or Firm—David T. Bracken

(57) ABSTRACT

The present invention is a system of wireless, battery operated temperature sensing devices which transmit ambient or other sensed temperature information to a programmable thermostat. The compact construction and multi-level programming of the temperature sensing devices for only periodic transmission of temperature information to the programmable thermostat permits years of operation with power supplied by small, inexpensive batteries. The temperature sensing devices are therefore easily installed at any location within about 100–200 feet from the programmable thermostat. The present invention also comprises a method of retrofit for the programmable thermostat of U.S. Pat. No. 5,449,319, whereby a compact receiver device is connected to available connections for input of remotely transmitted information and the programming of the programmable thermostat is adapted to receive, store, display and control environmental control devices according to the input temperatures received from the temperature sensing devices.

17 Claims, 15 Drawing Sheets

(1 OF 3)

(2 OF 3)

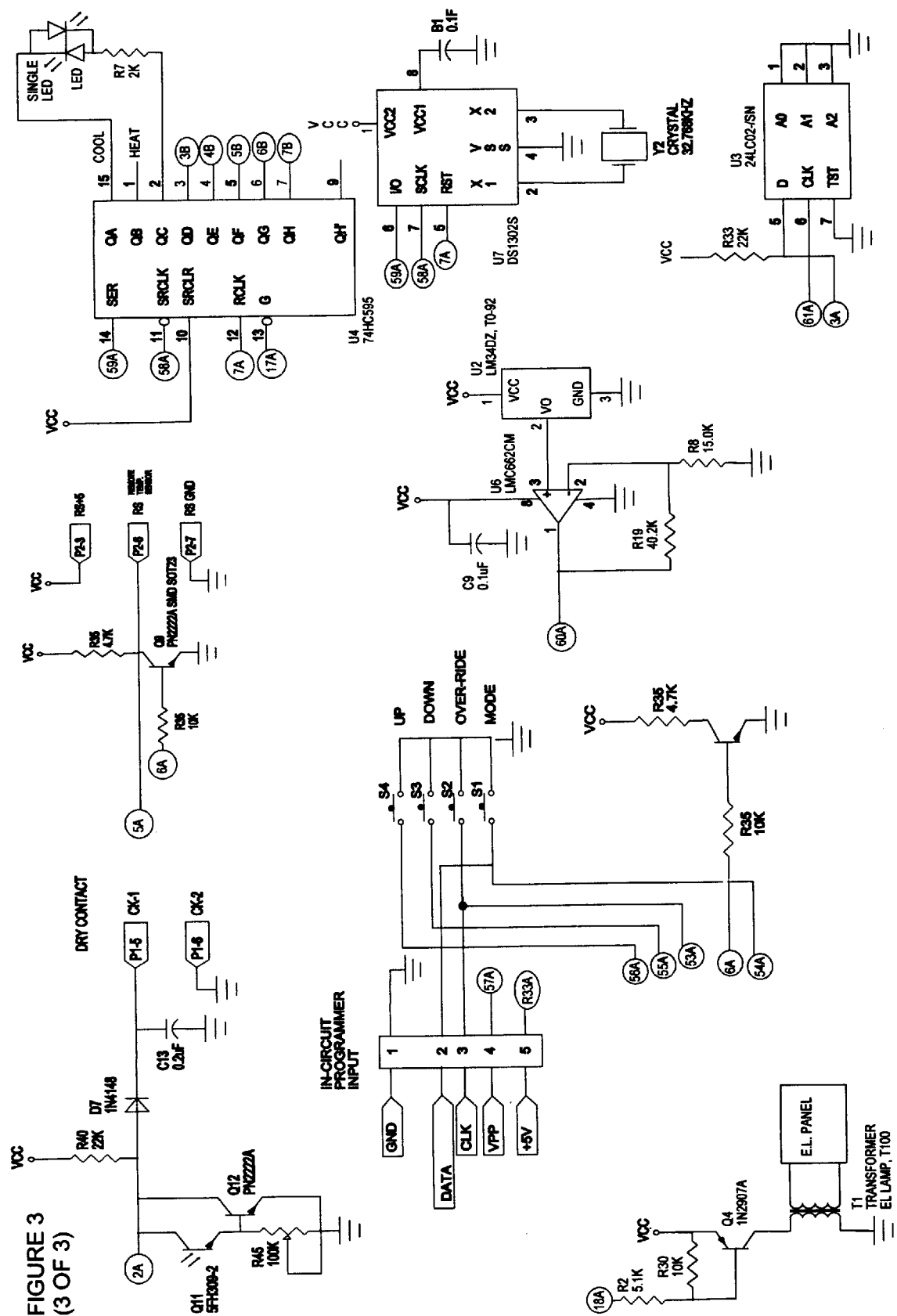

FIGURE 4
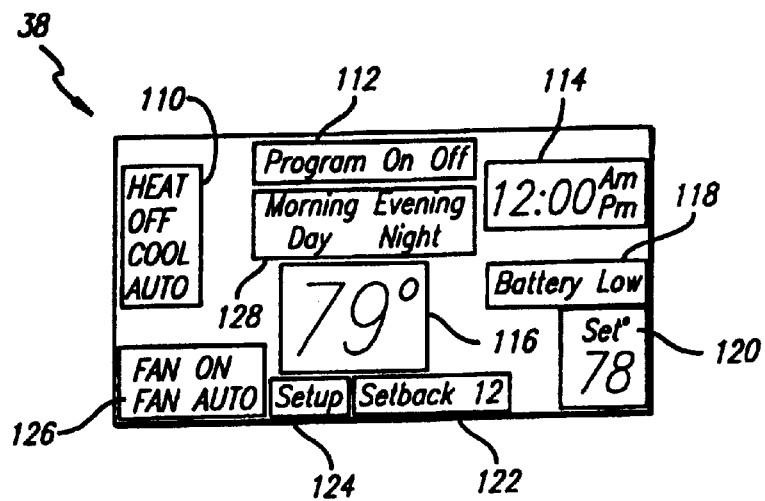
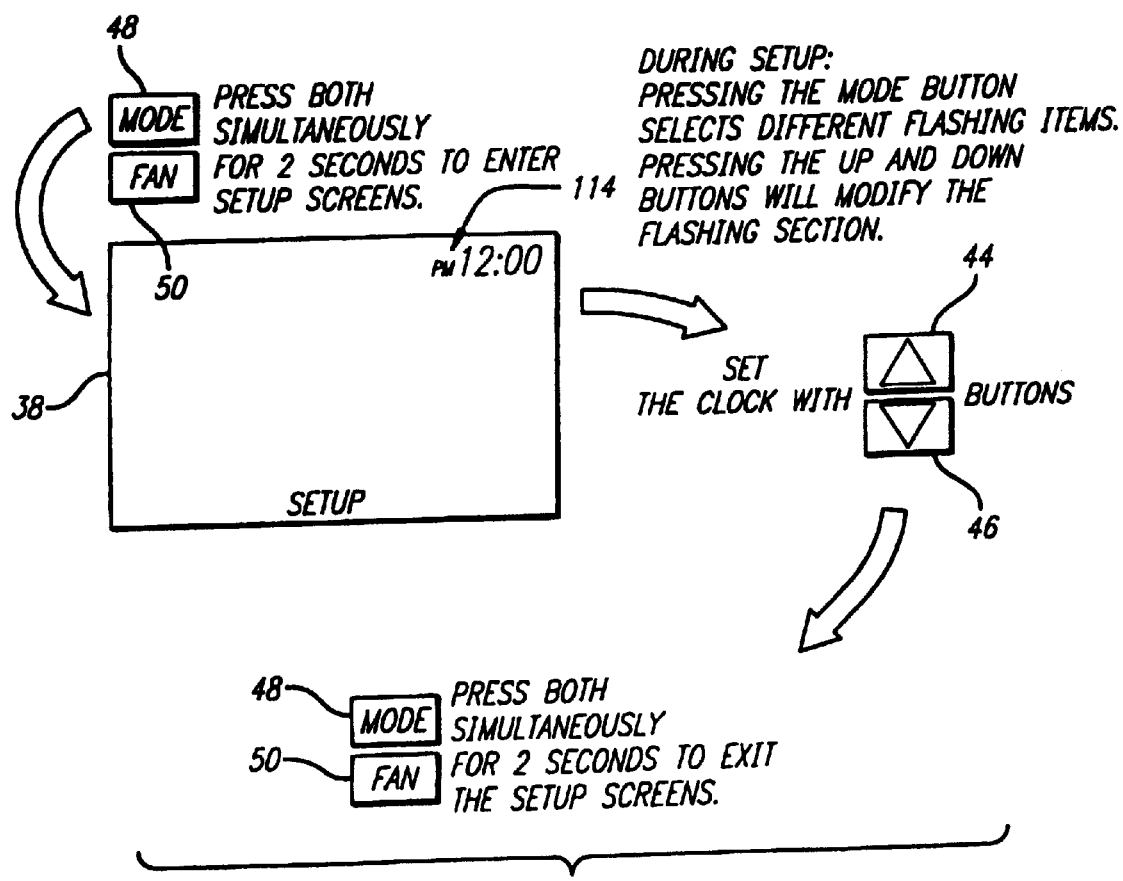
FIGURE 5

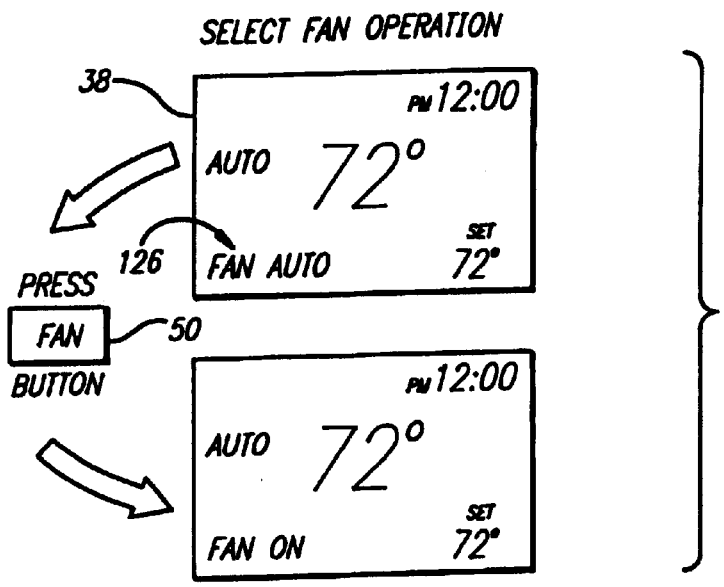
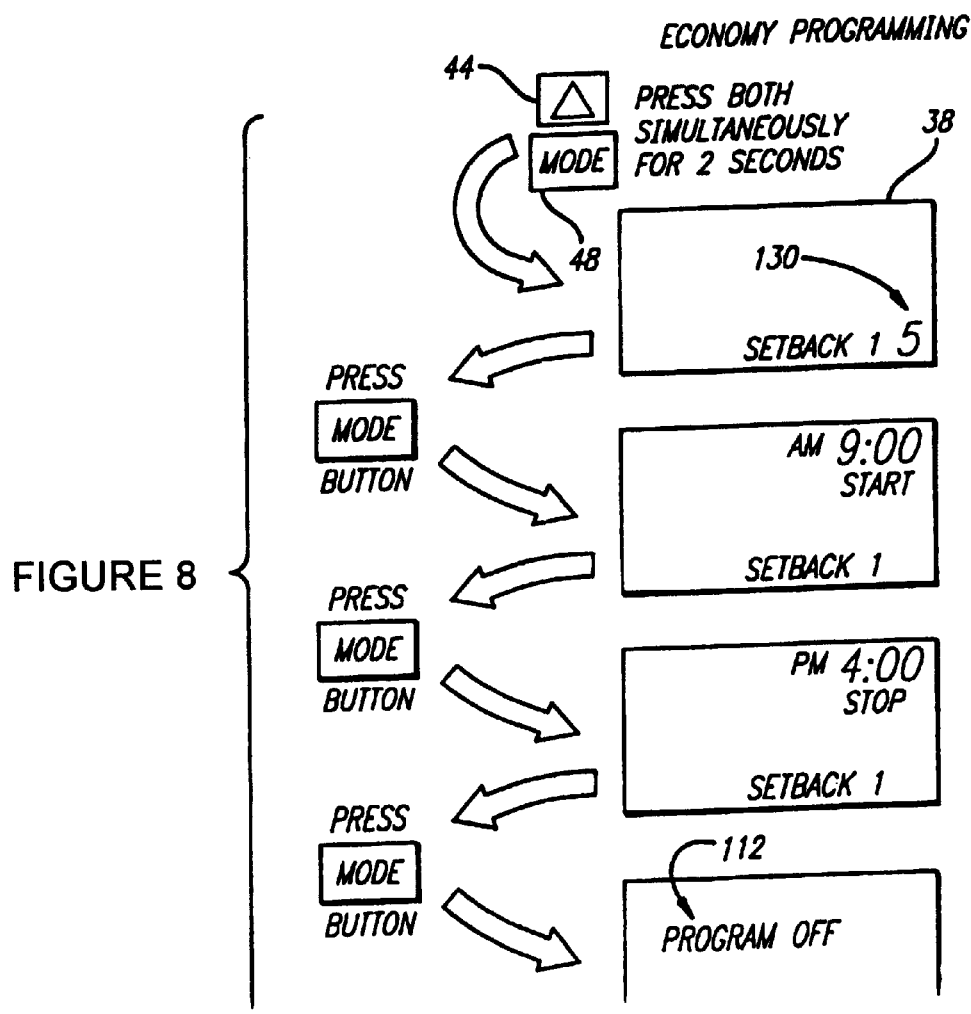

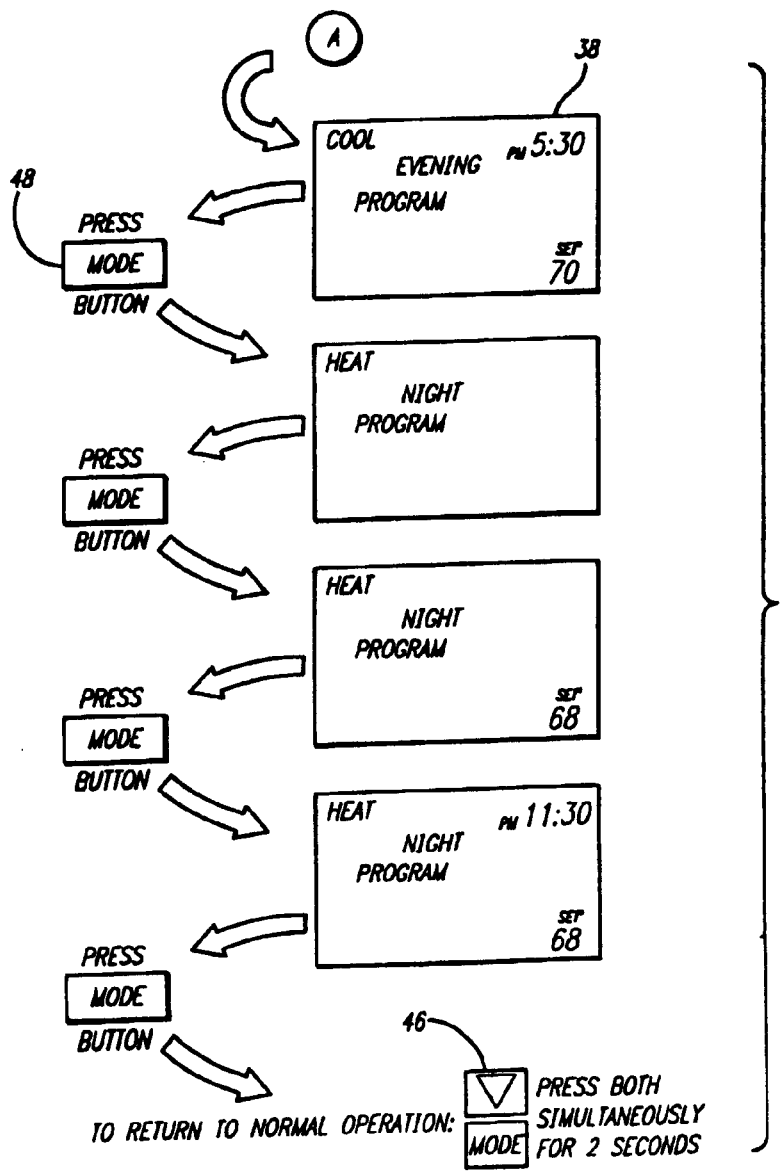

FIGURE 11
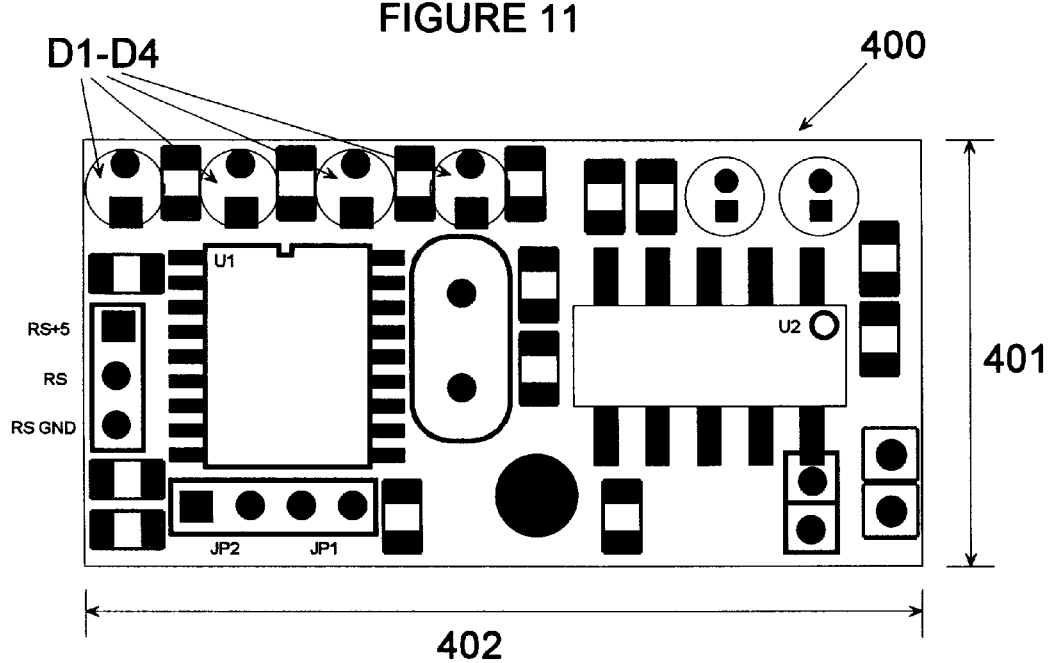
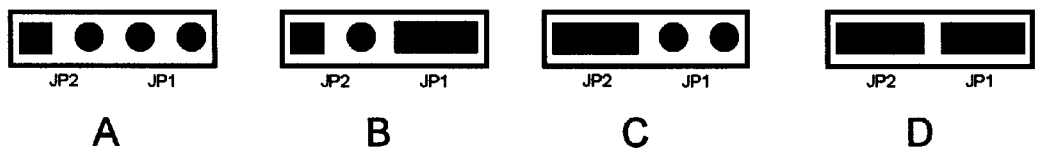
FIGURES 12A-D
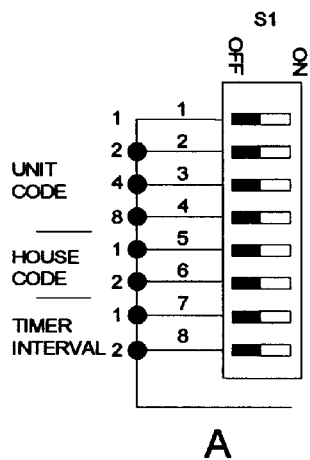
A
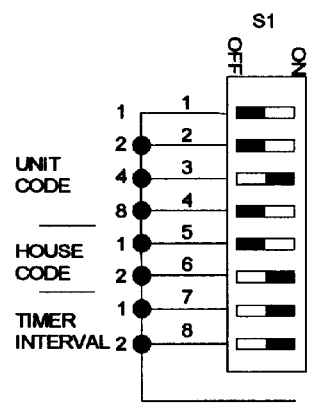
B
FIGURES 13 A,B

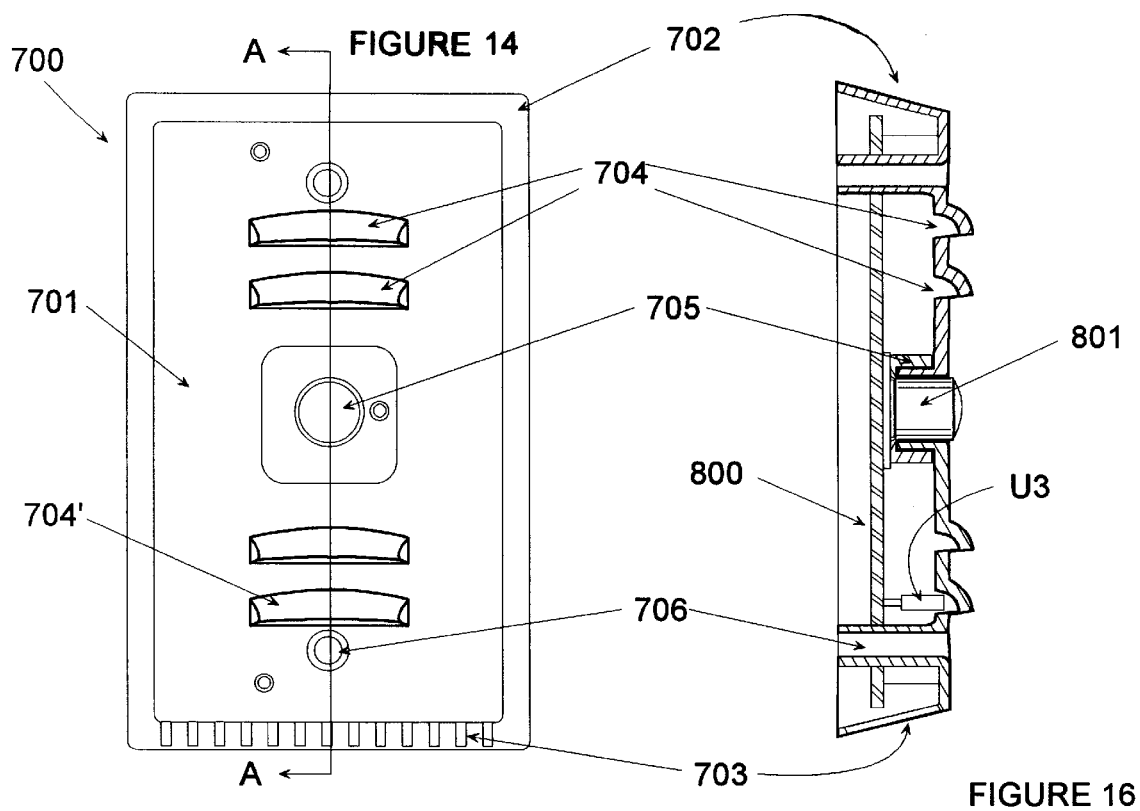
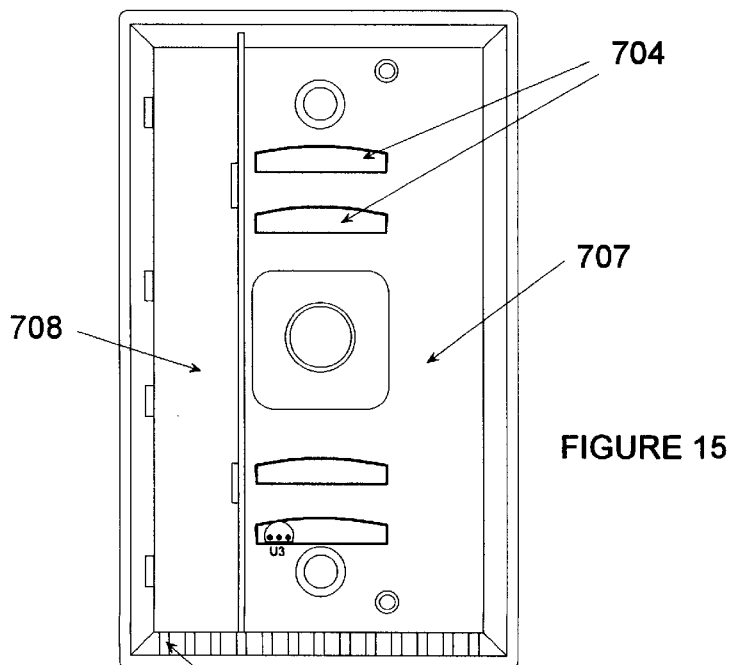
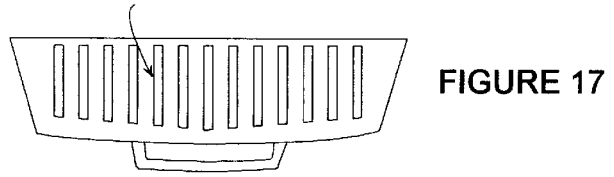
FIGURE 14
FIGURE 15
FIGURE 16
FIGURE 17

REMOTE TEMPERATURE SENSING TRANSMITTING AND PROGRAMMABLE THERMOSTAT SYSTEM

This application is a continuation in part of application Ser. No. 09/079,326 filed May 14, 1998, now pending, which is a continuation in part of application Ser. No. 08/802,640, filed Feb. 19, 1997, now U.S. Pat. No. 6,116,512, which is a division of Ser. No. 08/088,767, filed Jul. 8, 1993, now U.S. Pat. No. 5,348,078.

BACKGROUND OF THE INVENTION

The present invention relates to programmable thermostats having remote temperature sensing inputs from wireless temperature sensing transmitters.

The present state of the art in digital programmable thermostats presents operational flexibility unknown with prior art analog mechanical devices. As shown in U.S. Pat. No. 5,449,319, a compact, low voltage programmable thermostat may have multiple operating modes available to the user. It is preferable that temperature sensing means transmit from various locations inside and outside a temperature controlled location the ambient temperature to the programmable thermostat. An important limitation in placing temperature sensing means in the several locations where they may be useful in control or providing information to the user through the programmable thermostat is that such temperature sensing means require power to sense and wirelessly transmit the temperature information. Such power is known to be adequately supplied with direct wiring to the general AC power supply available in each location. However, such direct wiring is often difficult and expensive to install in retrofit applications. The preferred locations of the temperature sensing means in a room or building exterior location may be effectively eliminated due to difficulty and/or expense of providing direct wiring.

SUMMARY OF THE INVENTION

The present invention is a system of wireless, battery operated temperature sensing devices which transmit ambient or other sensed temperature information to a programmable thermostat. The compact construction and multi-level programming of the temperature sensing devices for only periodic transmission of temperature information to the programmable thermostat permits years of operation with power supplied by small, inexpensive batteries. The temperature sensing devices are therefore easily installed at any location within about 100–200 feet from the programmable thermostat. The present invention also comprises a method of retrofit for the programmable thermostat of U.S. Pat. No. 5,449,319, whereby a compact receiver device is connected to available connections for input of remotely transmitted information and the programming of the programmable thermostat is adapted to receive, store, display and control environmental control devices according to the input temperatures received from the temperature sensing devices.

It is another aspect of the invention to provide wireless temperature sensing transmitters transmitting one of a plurality of house codes to the programmable thermostat before the transmission of a sensed temperature, such that each programmable thermostat receives and stores or otherwise acts on temperature information from temperature sensing transmitters transmitting a house code identical to that set by a user for the programmable thermostat. Thus, within transmitting reception distance of each other may be located as many programmable thermostats as there are separate house codes, such that the temperature sensing transmitters set to transmit a single house code may provide information to a single or more programmable thermostats with the same set house code. In a setting where separate temperature control is required between separate floors of a building or closely spaced structures and the transmissions of some temperature sensing transmitters are intended for only one of the two or more zones of separate temperature control, the reception of temperatures from only temperature sensing transmitters having the same house code permit the use of the invention system of temperature sensing transmitters and a programmable thermostat.

It is yet another aspect of the invention to provide wireless temperature sensing transmitters transmitting one of a plurality of unit codes to the programmable thermostat before the transmission of a sensed temperature, such that each programmable thermostat receives and stores or otherwise acts on temperature information identified as unique among the received temperature information. Thus, a received temperature may be stored only for display to a user interface screen, whereas such temperature sensing of interest may be each of the locations in which a temperature sensing transmitter is located, i.e., wine cellar, exterior or interior hot tub, kitchen, office areas, meeting rooms, high and low locations in a high ceiling room. The user viewing such information has the option of adjusting the temperature control means in response to that information, such means including changing setpoints, deadbands, mode variables and the like for the programmable thermostat and/or adjusting air flow vents to redirect heated or cooled air flow. In addition, the uniquely identified temperatures may be combined mathematically to provide control inputs to the programmable thermostat programming. In a specific example below, an embodiment of the present invention provides a retrofit receiver wherein the temperatures from non-excluded temperature sensing transmitters are averaged and that average is used as the ambient temperature against which pre-programmed set points and control algorithms are compared for response by the environmental control equipment such as fans, air conditioning, humidifying and heating equipment.

The present invention also provides battery operated temperature sensing transmitters capable of permitting the user to set variable periods of time between transmission of temperature information to the programmable thermostat. It is preferred that four delay periods be provided such that periods of test response, fast response, slow response, no response are determined by the user depending on the use of the temperature for the location in which the temperature sensing transmitter will be placed. A test response period may be only a few seconds long so that transmission reception may be easily tested at the programmable thermostat. A fast response period may be a few minutes long so that sudden changes in a location temperature may be acted upon by the programmable thermostat. A slow response period of around 4–9 minutes may be used where fast response is not needed, i.e., a typically unoccupied room. A no response period may be 10 minutes or more where a sensed temperature is transmitted only for information display, i.e., an outside temperature, garage or a room whose air flow ducts are closed for non-occupancy.

The present invention also comprises receiver means for the programmable thermostat, described below as a retrofittable receiver means, having a plurality of LED's indicating reception of information from temperature sensing transmitters with the same house code as that of the programmable thermostat. Each LED is activated (lighted) only by reception of information from a temperature sensing transmitter having a unit code set to the same unit code as that which will activate that specific LED. Thus, a temperature sensing transmitter may be set to the test response period and the effective reception of temperature information at the programmable thermostat may be confirmed by viewing the flashing of receiver means LED corresponding to the unit code set at the temperature sensing transmitter.

BRIEF DESCRIPTION OF THE DRAWINGS

FIG. 4 shows a display portion of the programmable thermostat of FIG. 1 and particularly illustrates an exemplary FIG. 5 shows the display portion of the programmable thermostat during execution of a quick start software module;

FIG. 7 shows the display portion of the programmable thermostat during execution of a fan operation control software module;

FIG. 8 shows the display portion of the programmable thermostat during execution of an economy programming mode software module;

FIGS. 10A–10C show the display portion of the programmable thermostat during execution of an advanced programming mode software module.

FIG. 11 is a top view of the component projecting side of the circuit board of the receiver means of FIG. 2.

FIGS. 12 A–D are alternate jumper settings corresponding to alternate house codes for reception of information from the temperature sensing transmitter of FIG. 1.

FIGS. 13 A,B are alternate settings of switches S1 of the temperature sensing transmitter of FIG. 1, showing user settable configurations for timer codes and transmission of unit codes and house codes.

FIGS. 14–17 are, respectively, front, rear, cutaway side and bottom views of the housing for the temperature sensing transmitter of FIG. 1.

DETAILED DESCRIPTION OF THE INVENTION

Figure 1:
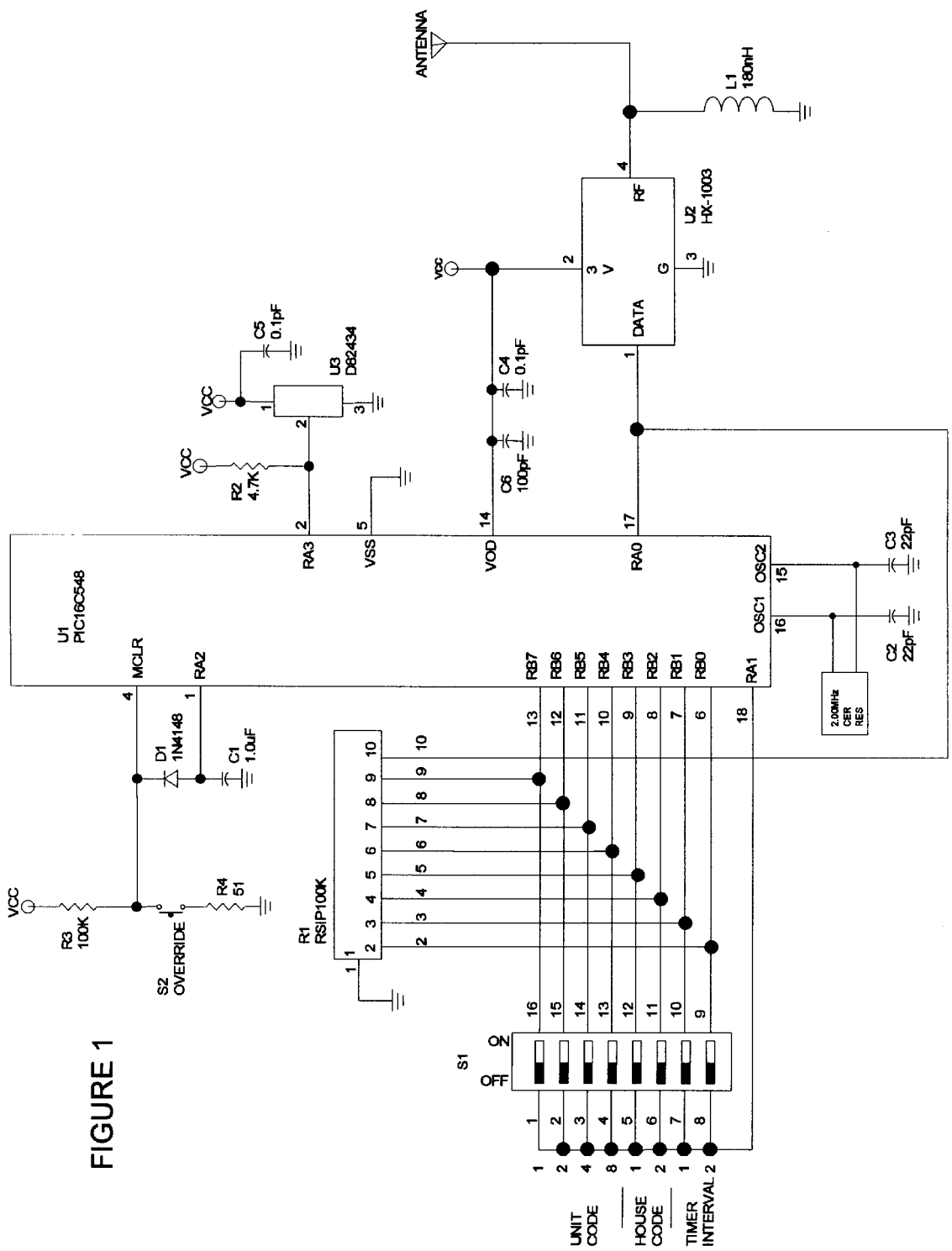
FIG. 1 is an electrical schematic diagram of the invention temperature sensing transmitter.
Figure 18:
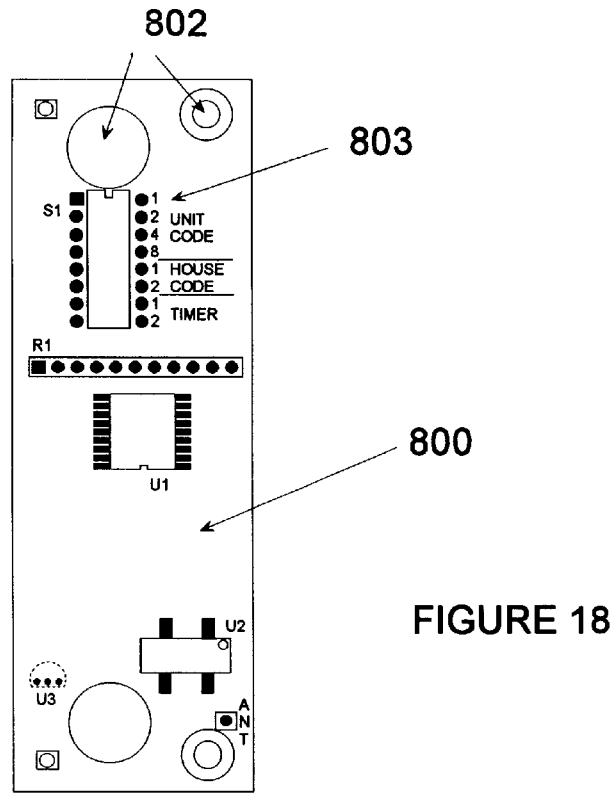
FIG. 18 is a top view of backside of the circuit board of the temperature sensing transmitter of FIG. 1, such circuit board adapted to be secured in the housing of FIGS. 14–17 and connected to batteries, as shown in FIG. 19.

FIGS. 1 and 18 show a preferred embodiment of the temperature sensing transmitter of the present invention. A temperature sensing device U3 senses and transmits to and stores for wireless transmission in microprocessor U1 the ambient temperature sensed by device U3. Device U3 as shown in FIG. 18 comprises broken lines, indicating that the device projects generally normal to the front side of circuit board 800, as opposed to the top of view of the back side of circuit board shown in FIG. 18, and as further shown in relation to the mounted circuit board 800 in FIG. 16. An alternate embodiment of temperature sensing device U3 comprises extending the electrical connection of the temperature sensing device to circuit board 800 whereby device U3 may sense temperature of liquids or similar electrically extreme environments at a distance or otherwise electrically insulated from the rest of the electrical components of the temperature sensing transmitter. Such distant temperature measurements may include swimming pool or spa water temperatures (with adequate waterproof sheathing for device U3).

With further reference to FIGS. 1 and 18, on-off switches set S1 comprise switches 1–4 for unit codes, respectively, 1,2,4 and 8, switches 5 and 6 for house codes 1 and 2, respectively, and switches 7 and 8 for timer intervals 1 and 2 respectively. Switches set S1 is effectively connected to microprocessor U1 such that the on-off settings of the switches therefore determine unit codes 0–15, house codes 0–3 and timer intervals 0–3 for transmissions made by the temperature sensing transmitter. A 2.00 MHz CER RES ceramic resonator is also electrically connected to the microprocessor U1 as shown. As may be readily appreciated, other timing or clocking schemes can be employed. Switch S2 is provided to override the transmission restriction imposed by the settings of timer interval switches 7 and 8, thereby providing continuous transmission of the temperature sensed by device U3.

As a specific example of alternate specifications of the codes and timing intervals, FIG. 13A shows all of the switches of switch set S1 in the off positions, imposing on the temperature sensing transmitter a house code of 0, a unit code of 0 and a timing interval of 0 which corresponds to the test response period (5 second non-transmission intervals). In contrast, FIG. 13B shows the switches of switch set S1 in on and off positions such that the following are imposed: house code of 2, a unit code of 4 and a timing interval of 3 which corresponds to the no response period (10 minute non-transmission intervals).

Figure 19:
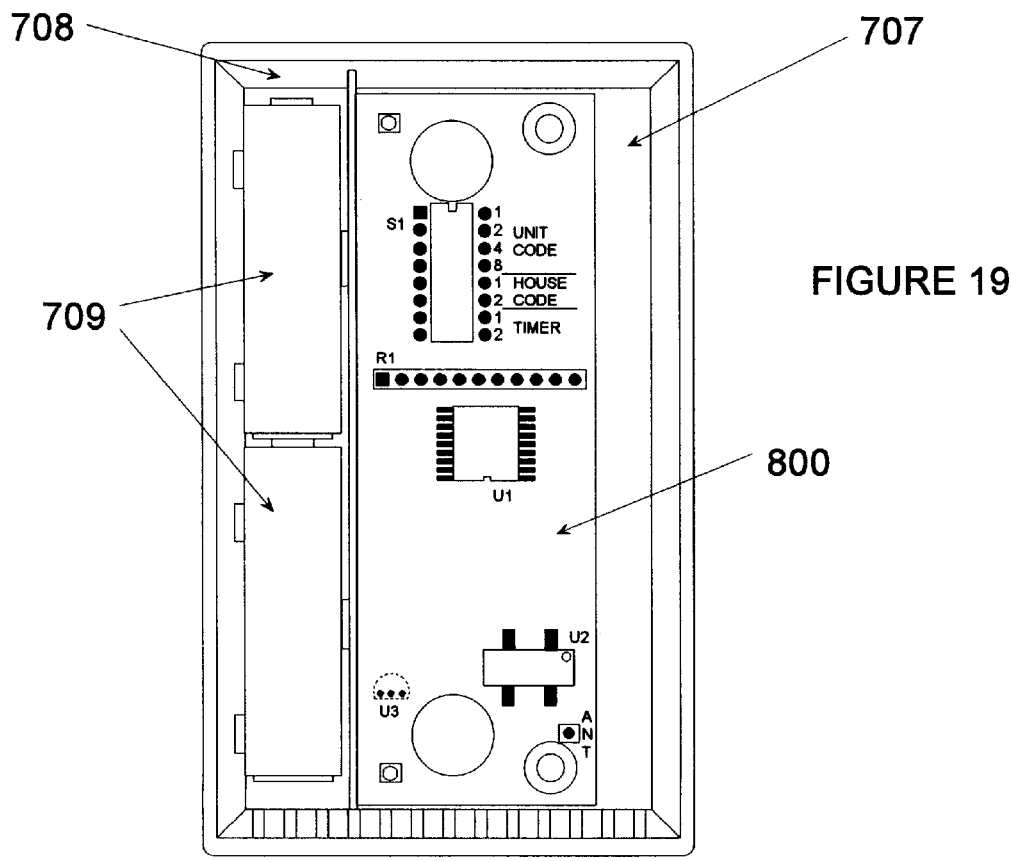

As in FIG. 1, microprocessor U2 receives from microprocessor U1 information for transmission as required by the settings for house code, unit code and timing interval, such information comprising first a house code, then the unit code and finally a sensed temperature, whereupon the information is transmitted through the ANTENNA to receiver means at the programmable thermostat. FIG. 18 shows a preferred circuit board arrangement of the components of the temperature sensing transmitter as disclosed in FIG. 1, albeit showing only certain physically larger components and including holes 802 at top and bottom ends of circuit board 800. Switch set S1 is shown in location 803, thereby available to easy switch setting at the backside of the circuit board 800 by the user. FIG. 19 shows the temperature sensing transmitter of FIG. 18 mounted in a circuit board section 707 of a support housing 700. Battery section 708 is shown in FIG. 19 as securing therein two 1.5 volt size "AA" batteries which are appropriately electrically connected with temperature sensing transmitter as shown in FIG. 1 (connections not shown) to supply all the power required in normal operation of the temperature sensing transmitter with a timer interval switch setting of "1" for fast response period (about 2 minutes of non-transmission) for the temperature sensing transmitter for a period of 1 to 2 years or longer.

Support housing 700 is shown in more detail in FIGS. 14–17, wherein a front side 701 comprises vents 704 for encouraging of ambient air flow through the vents, thereby causing upward convection draft of air through vent slots 703 and bottom vent 704' across device U3 for accurate temperature sensing. Holes 706 correspond to holes in circuit board 800 such that the circuit board 800 may be secured to a wall or other surface mounting. In cutaway side view in FIG. 16, override button 801 comprises rubber buttons with carbon switching materials, although other user input mechanisms can be employed. Depressing button 801 permits the user at a temperature sensing transmitter surface mounted within housing 700 to override the timer interval restrictions and continuously transmit the codes and sensed temperature. Releasing button 801 restores the timer interval imposed by the switches 7 and 8.

Support housing 700 comprises a length of about 4.7 inches, a width of about 2.8 inches and a height of about 0.8 inches. Surface mounting in a room or area is made very simple since no direct wiring to a power supply is needed.

Figure 2:
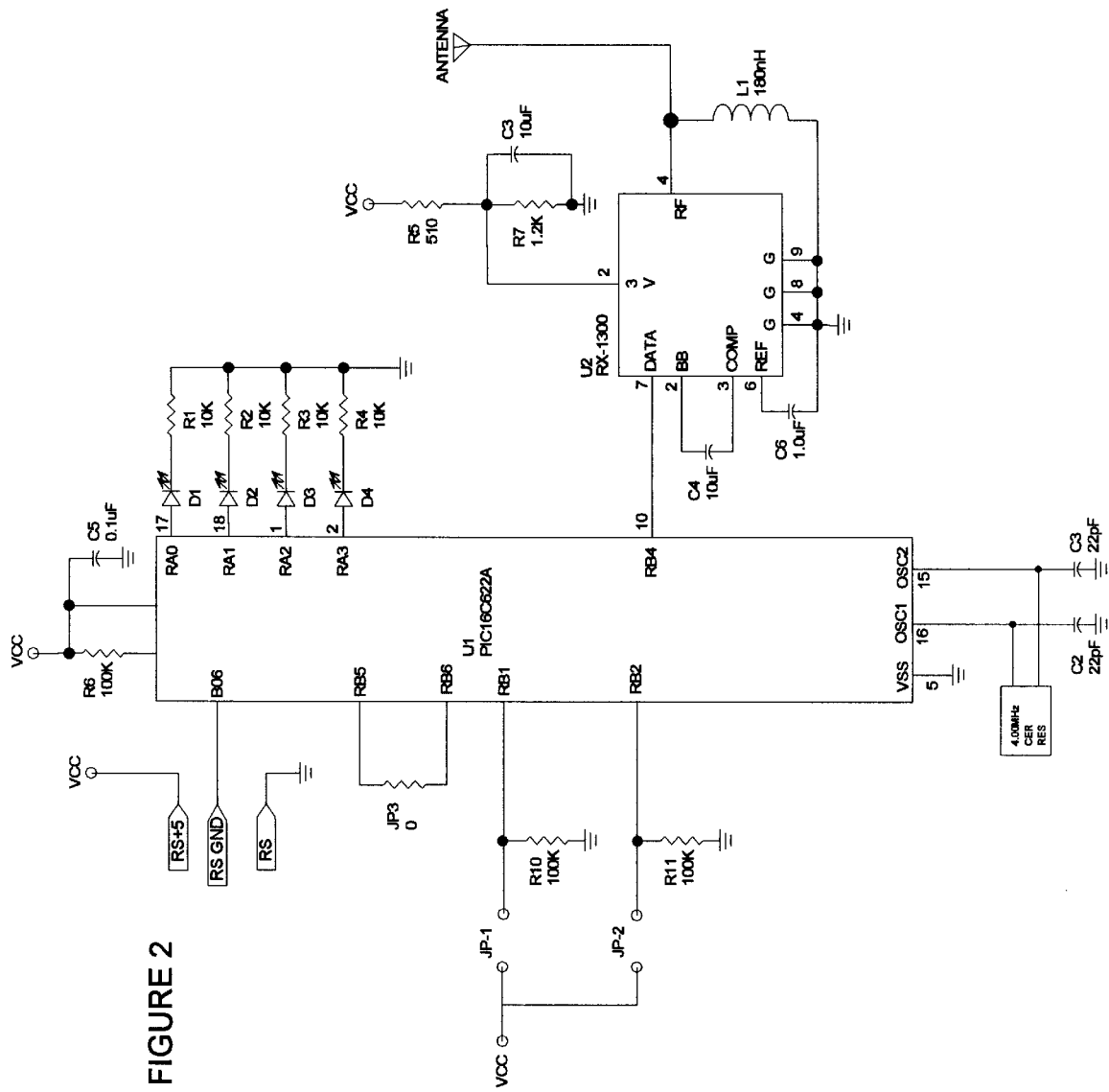
FIG. 2 is an electrical schematic diagram of the invention retrofit receiver means.
Figure 3:
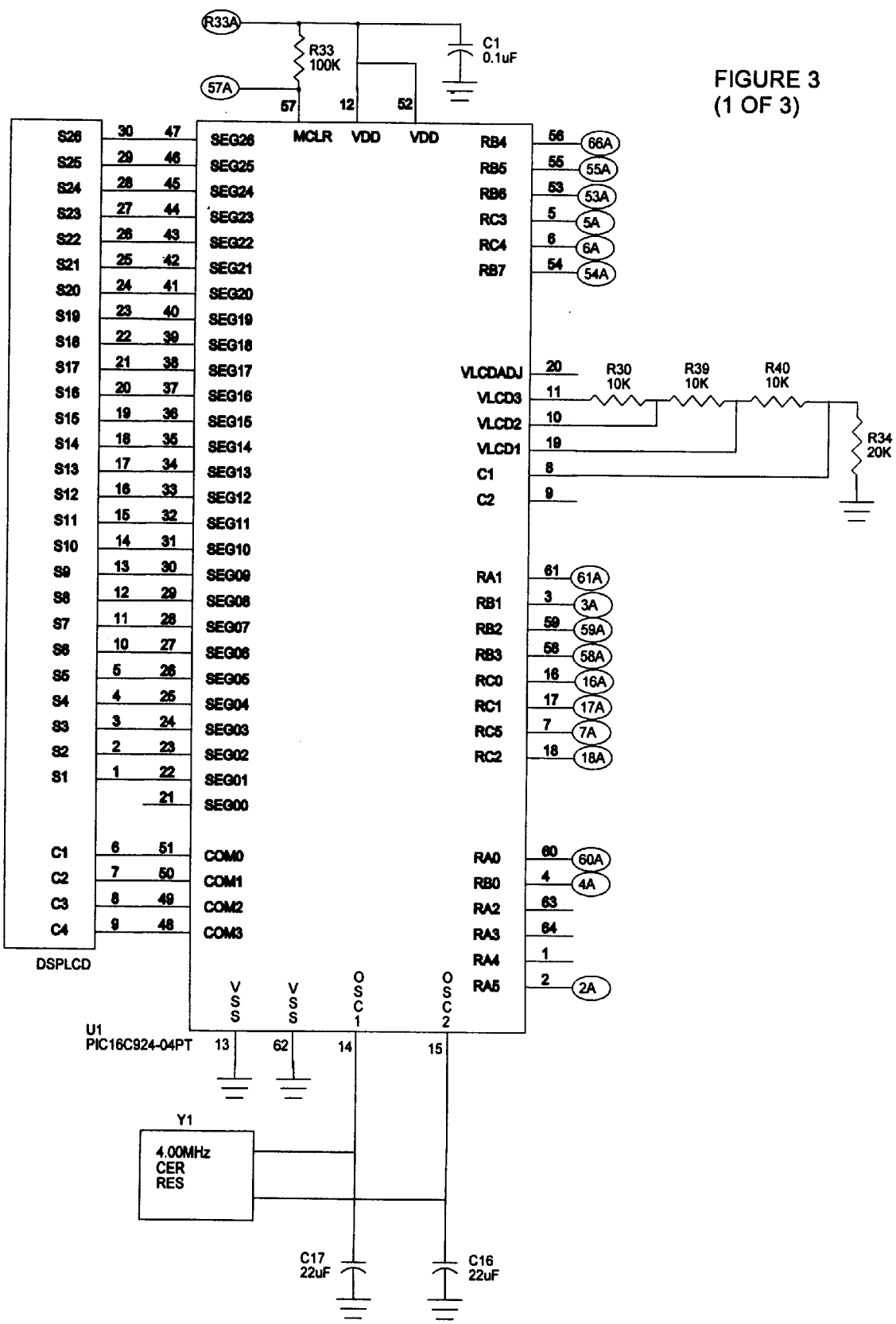
FIG. 3 is an electrical schematic diagram of the invention programmable thermostat adapted to connect with the receiver means of FIG. 2.
Figure 3:
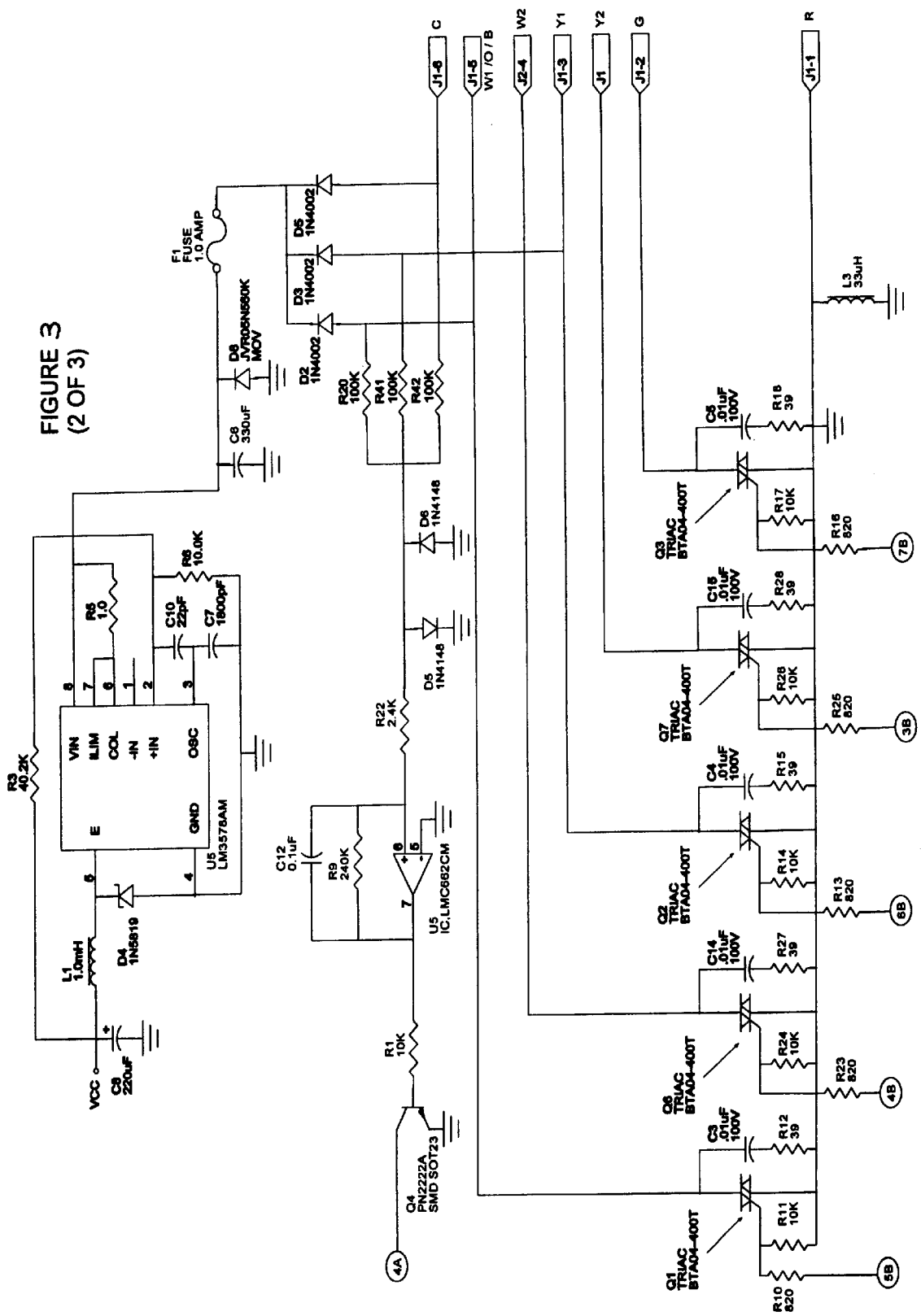

Receiver means are shown in FIG. 2 with connections to a programmable thermostat at connections RS+5, RS and RS GND, appropriately identified in the programmable thermostat of FIG. 3 for wired connection thereto. The receiver means circuit board 400 of FIG. 11 shows all the components identified in FIG. 2, albeit without specific designation of all the components. The small size of circuit board 400 at a length 402 of about 2 inches and a width 401 of about 1 inch, at a weight of about less than one once, permits retrofitting onto an existing circuit board with no more support than relatively short (0.5–2 inches) wire connection of connections RS+5, RS and RS GND between the programmable thermostat circuit board and the receiver means circuit board 400. Appropriate wire connections comprise solder or very small pressure or screw type connectors. The receiver means circuit board 400 may simply hang freely from the supported programmable thermostat circuit board without cross interference of the operation of either the programmable thermostat or the receiver means.

Receiver means as shown in FIG. 2 comprises microprocessor U1 and receiver U2 effectively connected such that the transmitted information of a temperature sensing transmitter is received and compared to settings of jumpers JP-1 and JP-2, which connections or lack thereof determine the house code with which microprocessor U1 compares the received house code. That comparison, if properly matched, then causes microprocessor U1 to store the temperature information transmitted in a unique memory location specific to the transmitted unit code. FIGS. 12A–D identify, for this example and respectively, pin connections of jumpers JP-1 and JP-2 imposing on the receiving means restriction to receiving transmitted signals from temperature sensing transmitters with the house codes 0, 1, 2, and 3.

A 4.00 MHz CER RES ceramic resonator is also electrically connected to the microprocessor U1 as shown. As may be readily appreciated, other timing or clocking schemes can be employed. In one embodiment of the present invention, the period of time between receptions of temperature sensing transmissions is measured for each sensed temperature stored. If the non-transmission period is greater than a pre-set value indicating a no response period is imposed on the temperature sensing transmitter, that temperature value is excluded from calculations or actions involving automatic control of the programmable thermostat.

In one embodiment of the present invention, sensed temperatures of the temperature sensing transmitters stored in microprocessor U1 of FIG. 2 are averaged and the result transmitted to microprocessor U1 of FIG. 3, which result overrides and replaces for all programmable thermostat uses and functions the sensed temperature of U2 in FIG. 3, thereby providing a displayed temperature on the display screen for the averaged temperatures sensed by the temperature sensing transmitters in their various locations. In another embodiment of the present invention, the user may depress the MODE button and obtain a programming mode in which each of the sensed temperatures stored in microprocessor U1 of FIG. 2 may be successively (from unit codes 0 through 15) retrieved from that microprocessor and displayed on the display screen in the location of the averaged sensed temperature as just described upon successive user depression of the down button 46. The user is thus provided with a quick survey of the ambient or other sensed temperatures all the remote locations in which the temperature sensing transmitters are located.

Receiver means of FIGS. 2 and 11 comprise further advantages in the form of LED's D1–D4. These LED's D1–D4 are lighted upon receipt of transmissions from temperature sensing transmitters with matching house codes and, respectively, unit codes 0 to 3. This provides the user with visible confirmation of proper reception of at least the transmissions of those temperature sensing transmitters. While only four of the 16 possible temperature sensing transmitters have transmission reception confirmation with LED's D1–D4 in this manner, the user desiring confirmation of the transmission reception of the other temperature sensing transmitters than those with unit codes 0–3 may temporarily switch the unit codes with those other temperature sensing transmitters for the rare times when testing for transmission reception is desired.

The preferred programmable thermostat of the present invention comprises the functionality provided by the device of FIG. 3, wherewith a housing supports a circuit board(s) supporting and connecting the electrical components as shown and operatively connected with user interface means including certain press buttons and a display screen, as shown in FIGS. 4 to 10A–C. The display screen comprises for example, a liquid crystal display with a Thermoglow backlight. The preferred programmable thermostat additionally includes a plurality of user input mechanisms which, in the exemplary illustrated embodiment, comprise an indicator light 42, an up button 44, a down button 46, a mode button 48 and a fan button 50.

With respect to the Figures, the electrical components are shown with preferred ratings or specifications below the component label. The component labels are designated with an "R" for resistors (whereby the rating is shown in Ohms), a "C" for capacitors, a "D" for diodes, a "K" for relays, an "ISO" for iso-optical coupler, a "Q" for transistors, a "U" for integrated circuits, an "L" for inductors, a "Y" for resonators, a "T" for transformers, an "S" for switches, and other appropriate designations as are well known in the art.

The thermostat electronics for the programmable thermostat with a digital display are described below with the understanding that they are generally illustrative of a low power programmable thermostat. Several aspects of the thermostat electronics are not described in detail, being understood by the skilled person with reference to FIGS. 1–3, to comprise an optimized versions of such devices.

The following is a description with reference to FIG. 3. A display DSPLCD, corresponding to the display screen, comprises for example, a liquid crystal display with a Thermoglow backlight connected to the microprocessor U1 as shown. Some of the input signals are processed by the programming circuitry and others may be supplied to the display DSPLCD. The user inputs, as determined by actuations of the user input mechanisms, are provided to the FIG. 3 electronics. The wireless user inputs may also be provided to microprocessor U1, a temperature sensor U2, a lamp SINGLE LED. A crystal Y2 and a ceramic resonator Y1 are also electrically connected to the microprocessor U1 as shown. The crystal Y2 preferably operates at 32.768 kHz and the ceramic resonator preferably resonates at 4.00 MHz. As may be readily appreciated, other timing or clocking schemes can be employed.

The microprocessor U1 is also electrically connected to the temperature sensor U7 via a microprocessor U6. The lamp EL PANEL is electrically connected to the microprocessor U1 via a transistor Q4 and a transformer T1 as shown. The integrated circuit U3 is connected to U1 as shown. The sensed temperature of sensor U7 is uniquely identified and stored so that it is retrievable by the programming of the programmable thermostat, apart from the sensed and stored temperatures of the temperature sensing transmitters.

The thermostat may include various combinations of environmental control apparatuses selected from a group comprising, for example, a heater, an air conditioning unit, a fan and heat pump. In the illustrated embodiment, the microprocessor U1 is programmable to expect an electric heat data bit and a heat pump data bit and, in a thermostat including an electric heater and a fan, a data bit is set such that the fan turns on instantly when heat is called for. In a thermostat including a single stage heat pump, a data bit is set such that the control signals generated by the microprocessor U1 are appropriately modified to accommodate a fan, compressor and reversing valve. Thus, another aspect of the present invention is the configurability of the thermostat. It should be appreciated that the thermostat can be modified to control additional and/or other apparatuses and devices such as a two-stage heat pump can be alternatively employed. Exemplary operating modes for the thermostat are discussed below in greater detail.

As shown in FIG. 3, the electronics also include control signal terminals R, C, W1/O/B, W2, Y1, Y2 which are electrically connected to the environmental control apparatuses mentioned above. More specifically, the terminal G provides a fan control signal. The terminal Y1 provides a cooling control signal. The terminal W1 provides a heating control signal. The terminal C provides a common or ground connection. The scope of the present invention also includes the provision of additional or different control signal terminals depending upon the nature of the apparatuses or devices to be controlled. Connections RS+5, RS and RS GND are appropriately connected with those connections shown in FIG. 2 for the receiver means, thereby showing the ease of retrofitting the present programmable thermostat with remote temperature sensing capability The thermostat electronics preferably include protection circuitry designed in consideration of the interface between the microprocessor U1 and the devices to be controlled thereby. Such protection circuitry includes the switching regulator U4 as well as the discrete circuit elements which include, but are not limited to, triacs Q1–3, 6, 7.

FIG. 4 illustrates an exemplary configuration of display fields within the display 38. Each display field preferably, but does not necessarily, occupy a predetermined portion of the display 38. Stated otherwise, the display 38 is preferably partitioned into nonoverlapping portions which are each dedicated to providing a predetermined visual indicia of a user programming input or a monitored environmental condition of interest. In so partitioning the display 38, portions of the LCD 66 are selectively activated by the microprocessor 54 of the transmitter unit 24.

In the exemplary illustrated embodiment, the display fields include a mode indication display field 110 which includes "HEAT", "OFF", "COOL" and "AUTO" sub-fields. One of the aforementioned sub-fields is activated depending upon which operating mode for the controlled apparatuses is selected. When the sub-field "HEAT" is activated, this provides the user with a visible indication that a heating operation has been selected. When the sub-field "COOL" is activated, the user is provided with a visible indication that a cooling operation has been selected. When illuminated, the sub-field "AUTO" provides an indication that the system will automatically changeover between heat and cool modes as the temperature varies. When the sub-field "OFF" is activated, this indicates that the entire system is turned off.

The plurality of display fields also include a program indication display field 112 which indicates the status of a stored timer program, the operation of which is described below in greater detail. When the sub-fields "Program" and "On" are both activated, this provides the user with an indication that stored programming is currently being executed. When the subfields "Program" and "Off" are both activated, the stored timer programming is not currently being executed.

Various data and/or monitored environmental conditions of interest are also presented in the form of visible indicia. Thus, the exemplary illustrated display 38 further comprises a clock display field 114 with "[hours]: [minutes]", "Am" and "Pm" sub-fields as shown in FIG. 4. The display fields also include a temperature display field 116 and a battery low indication display field 118. The clock display field 114 preferably shows the current time and is used to program the timer periods as discussed below with reference to the user programming aspects of the present invention. The temperature display field 116 shows the current temperature as measured by the temperature sensor 56.

As shown in FIG. 4 a desired set temperature display indication of the desired temperature set by a user of the system 20. The displays fields also include a setback indication display field 122, a setup indication display field 124, a fan operation indication display field 126 and a timer period indication display field 128. The setback indication display field 122 includes sub-fields "Setback", "1" and "2" and indicates features pertaining to setback programming which is discussed below with reference to FIG. 8. The setup indication display field 124 includes a "Setup" sub-field and is discussed below with reference to FIGS. 5 and 9. The fan operation indication display field 126 includes "FAN ON" and "FAN AUTO" sub-fields and is discussed below with reference to FIG. 7.

The timer period indication display field 128 "Day", "Evening" and "Night" subincludes "Morning", fields and is discussed below with reference to FIGS. 10A–10C.

A program executed by the microprocessor 54 provides an interactive programming interface which facilitates remote programming according to a plurality of programming modes of varying complexity. In a preferred embodiment, the plurality of programming modes comprise a basic programming mode, an economy programming mode and an advanced programming mode. Although all of the aforementioned programming modes may be implemented within a single computer executable program stored within or accessible to the microprocessor 54, they (and other executable program features) will hereinafter be referred to as "modules". Furthermore, it should be understood that each of the programming and/or control features described below can be implemented as a separate computer executable program, combined into several can also include an input port to facilitate uploading revised or updated versions of the executable program(s).

FIG. 5 shows the display 38 of the transmitter unit 24 during execution of a quick start software module by the microprocessor 54. Execution of the quick start software module begins when a user of the transmitter unit 24 presses both the mode button 48 and the fan button 50 simultaneously for some predetermined duration of time, e.g., two seconds. The clock display field 114 is first activated and, in the preferred embodiment, flashes while the time is being set up until the mode button 48 is pressed again indicating that the user wishes to enter the set time. The up button 44 and the down button 46 are selectively pressed to adjust the time in predetermined time increments such as 30 minute increments. It is further contemplated that the quick start software module may be modified such that the speed of transition from one time increment to the next differs depending upon how long either of the buttons 44, 46 is depressed. The transmitter unit 24 interactively prompts the user to provide other user inputs pursuant to a basic programming mode as discussed below with reference to FIG. 6. After screens by, for example, continuously pressing both the mode button 48 and the fan button 50 for two seconds.

Figure 6:
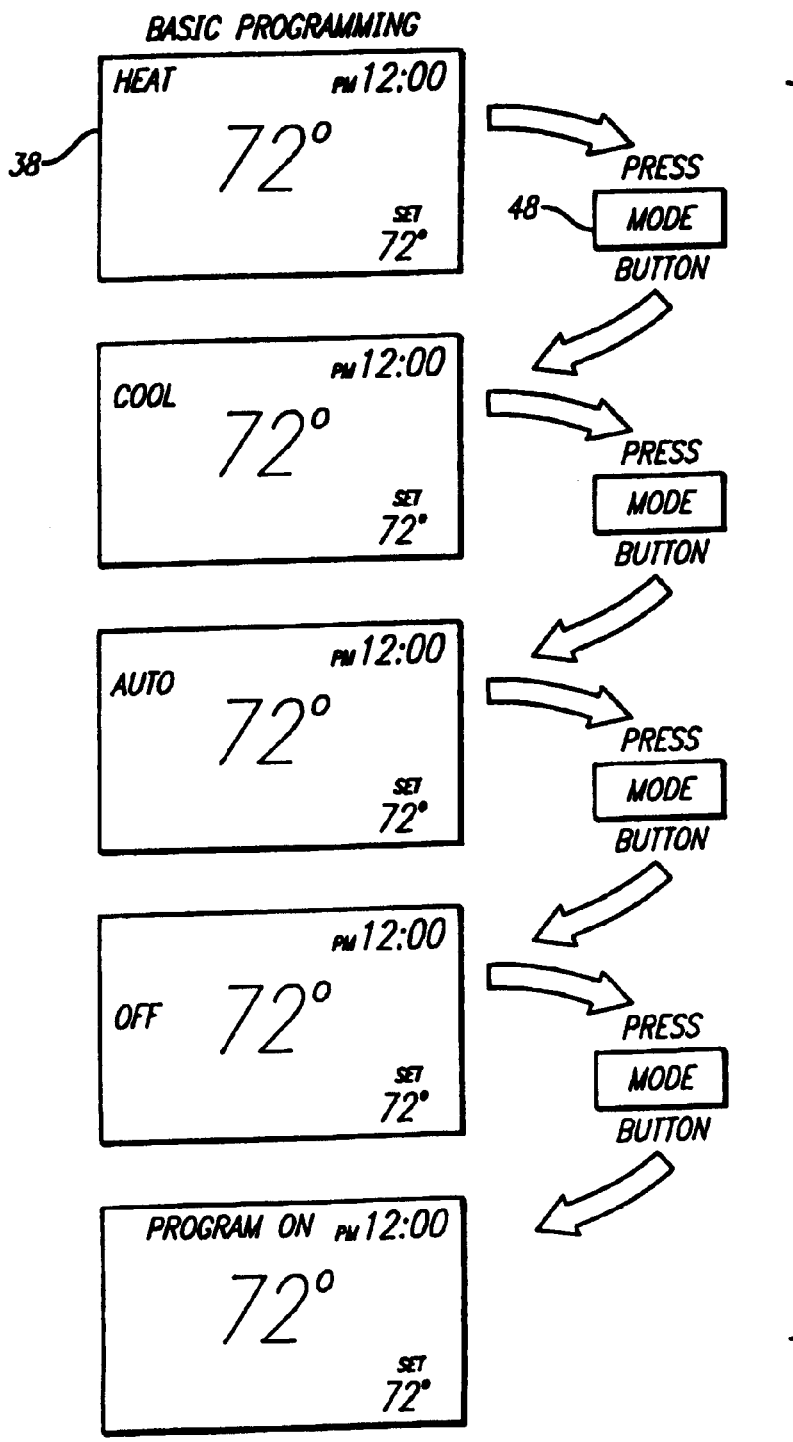
FIG. 6 shows the display portion of the programmable thermostat during execution of a basic programming mode software module.

FIG. 6 shows the display 38 of the transmitter unit 24 during execution of a basic programming mode software module by the microprocessor 54. During execution of the basic programming mode software module. the up button 44 and the down button 46 are employed to set a desired temperature for a particular operating mode (to be distinguished from programming mode). The operating modes include a HEAT mode, a COOL mode, an AUTO mode and an OFF mode. During the HEAT mode, the microprocessor 54 generates and controls the transmission of input signals which are received by the receiver/controller unit 22 which processes the input signals to generate control signals which are, in turn, provided to a heating apparatus such as a furnace. During the COOL mode, the receiver/controller unit 22 provides the control signals to a cooling apparatus such as an air conditioner. During the AUTO mode, control signals are automatically provided to both a heating apparatus and a cooling apparatus depending upon the desired temperature set by the user and a measured temperature in the environment to be controlled. The present invention additionally contemplates program modifications to facilitate temperature sampling enhancements, averaging, etc.

Transitions between the aforementioned operating modes are controlled by pressing the mode button 48. Once a desired operating mode has been selected and a desired temperature entered via appropriate manipulation of the up and down buttons 44, 46, the user exits from the setup screens by simultaneously pressing the mode button 48 and the fan button 50 as discussed above with regard to FIG. 5. The bottom portion of FIG. 6 shows that the mode button 48 is also employed to initiate execution of stored four time period operation, an advanced programming mode feature which is described below in greater detail with FIG. 7 shows the display 38 of the transmitter unit 24 during execution of a fan operation control software module by the microprocessor 54. Execution of the fan operation control software module begins when a user of the transmitter unit 24 presses the fan button 50 for a predetermined period of time thereby activating the fan operation indication display field 126. As shown in FIG. 7, a user may alternatively select between one of two different fan operating modes by employing the fan button 50. The fan operating modes include a FAN AUTO mode and a FAN ON mode. The microprocessor 54 generates and controls the transmission of input signals which vary depending upon which fan operating mode is selected. The controller device receives and processes the input signals to generate control signals which are, in turn, provided to a fan or similar apparatus. When the FAN AUTO mode is selected, the fan turns on only when there is a demand for heating or cooling. When the FAN ON mode is selected, the fan runs continuously.

FIG. 8 shows the display 38 of the transmitter unit 24 during execution of an economy programming mode software module by the microprocessor 54. The preferred controller 86 at the receiver/controller unit 22 is programmed to operate according to two setback protocols which are designed to save energy. More specifically, the setback protocols are used during times when climate control adjustments are less frequently needed such as during sleep and away periods. The precise nature of these setback protocols is determined by the user who employs the economy programming mode software module to remotely establish the setback protocols. In a preferred thermostat system 20. the setback protocols can only be activated when the operating mode is HEAT, COOL or AUTO.

FIG. 8 illustrates how a first setback protocol (designated "Setback 1") is established. A user initiates execution of the economy programming mode software module button 48 for a predetermined amount of time. The user then uses the up and down buttons 44, 46 to select one of a predetermined group of temperature offsets (e.g., 5, 10, 15 or 20 degrees Fahrenheit) which is displayed at an offset temperature display field 130.

During economy operation, a furnace or air conditioner will not turn on until the room temperature reaches the set temperature plus or minus the offset temperature. Once the desired offset temperature is selected, the mode button 48 is pressed to advance to the next two economy programming steps where start and stop times for the first setback protocol are similarly selected. A second setback protocol is established in identical fashion.

As illustrated at the bottom of FIG. 8, the program indication display field 112 provides an indication of whether or not a particular setback protocol is turned on. As with the other user inputs, the up and down buttons 44, 46 are employed to toggle the setback protocols between on and off operating statuses. When a user has finished programming the setback protocols, normal operation is resumed by simultaneously pressing the up button 44 and the mode button 48 for a predetermined amount of time. Conversely, economy programming can be turned on during normal operation by holding down the fan button 50 while pressing the up button 44. As may be readily appreciated, the microprocessor 54 can be programmed to respond in the same manner to different combinations of actuated user input mechanisms.

Figure 9:
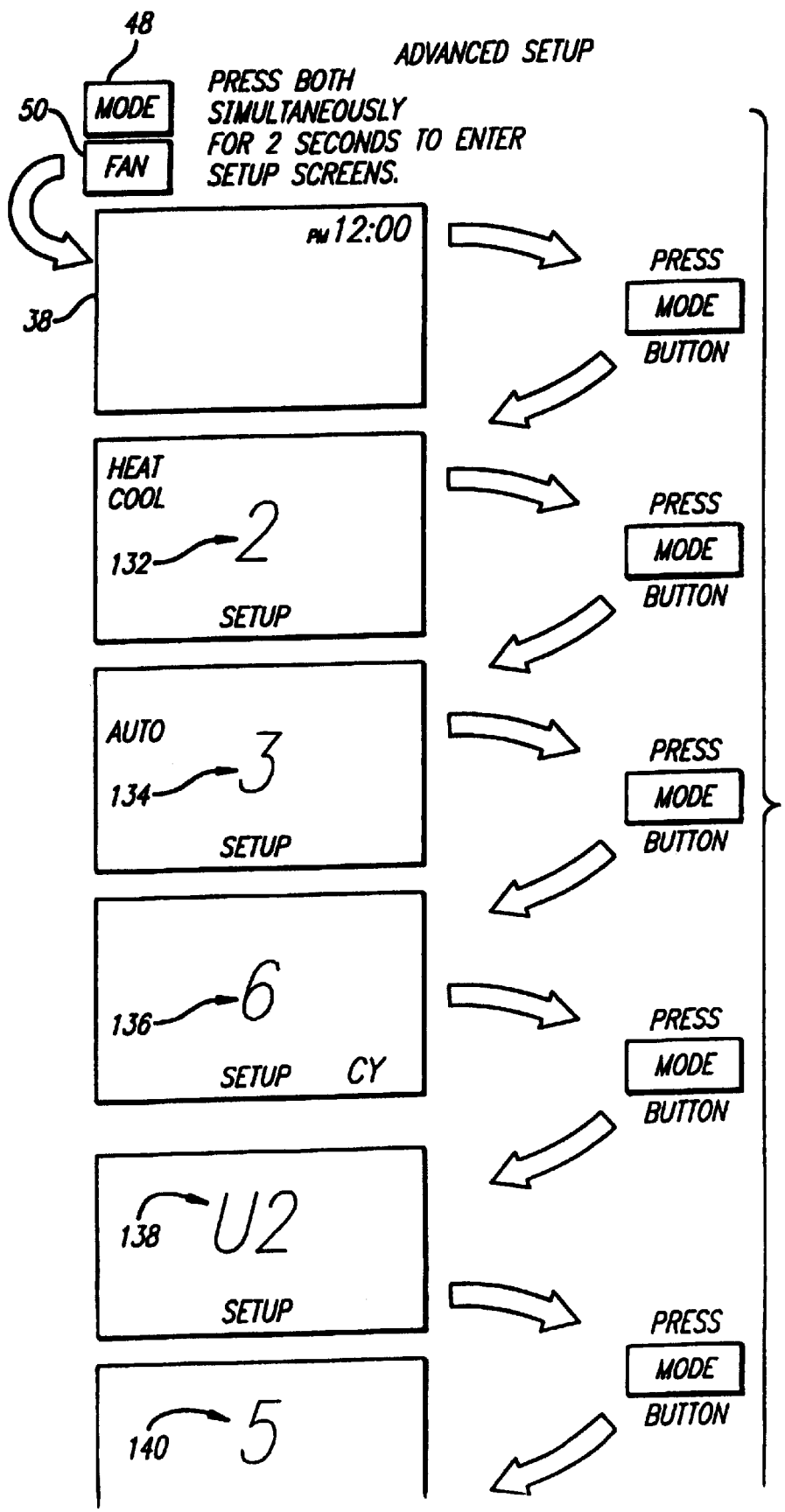
FIG. 9 shows the display portion of the programmable thermostat during execution of an advanced programming setup software module.

FIG. 9 shows the display 38 of the programmable thermostat during execution of an advanced programming setup software module by the microprocessor 54. A user initiates execution of the advanced programming setup software module by simultaneously pressing the mode button 48 and the fan button 50. First, the user is given an opportunity to adjust the time which is shown in the clock user inputs) are entered by pressing the mode button 48.

After the selected time is entered, the advanced programming setup software module provides control signals to the display 38 to present the user with an interactive display including a manual mode temperature swing display field 132. The manual mode temperature swing is the difference in temperature the room has to be from the desired set temperature to turn on heat or cool when the system 20 is operating in the HEAT or COOL manual operating modes, respectively. For example, a setting of "2" will not allow the heat to turn on until the room temperature is 2 degrees colder than the desired set temperature. Although an exemplary default manual mode temperature swing is 2 degrees (i.e., factory setting), this can be adjusted by employing the up and down buttons 44, 46. An exemplary range of temperature swing adjustment for the manual mode is 1–6 degrees, adjustable in one degree increments, other ranges and increments of temperature swing adjustment can be employed. Furthermore, it is contemplated that separate temperature swings could be provided for each of the manual modes.

After the temperature swing for the manual mode is entered, the advanced programming setup software module provides control signals to the display 38 to present the user with an interactive display including an automatic mode temperature swing display field 134. The automatic mode temperature swing is the difference in temperature the room has to be from the desired set temperature to turn on heat or cool, depending upon which is needed, when the system is operating in the AUTO operating mode. As shown in FIG. 9, an exemplary default automatic mode temperature swing is "3". A preferred range of temperature swing adjustment for the automatic mode is also 1–6 degrees, adjustable in one degree increments.

After the temperature swing for the automatic mode is provides control signals to the display 38 to present the user with an interactive display including a heating cycles per hour display field 136. The number of heating cycles entered limits the heater's on/off cycles per hour. As shown in FIG. 9, an exemplary default maximum number of heating cycles per hour is "6". A preferred range of adjustment for the maximum number of cycles per hour is 2–6 cycles, adjustable in one cycle increments.

After the number of heating cycles per hour is entered, the advanced programming setup software module provides control signals to the display 38 to present the user with interactive displays including a transmitter unit identification (ID) display field 138 and a house number display field 140. The transmitter unit ID and house number are likewise adjustable by pressing the up and down buttons 44, 46. To return to normal operation, the user presses the mode button 48 and the fan button 50 simultaneously for a predetermined period of time.

Figure 10A:
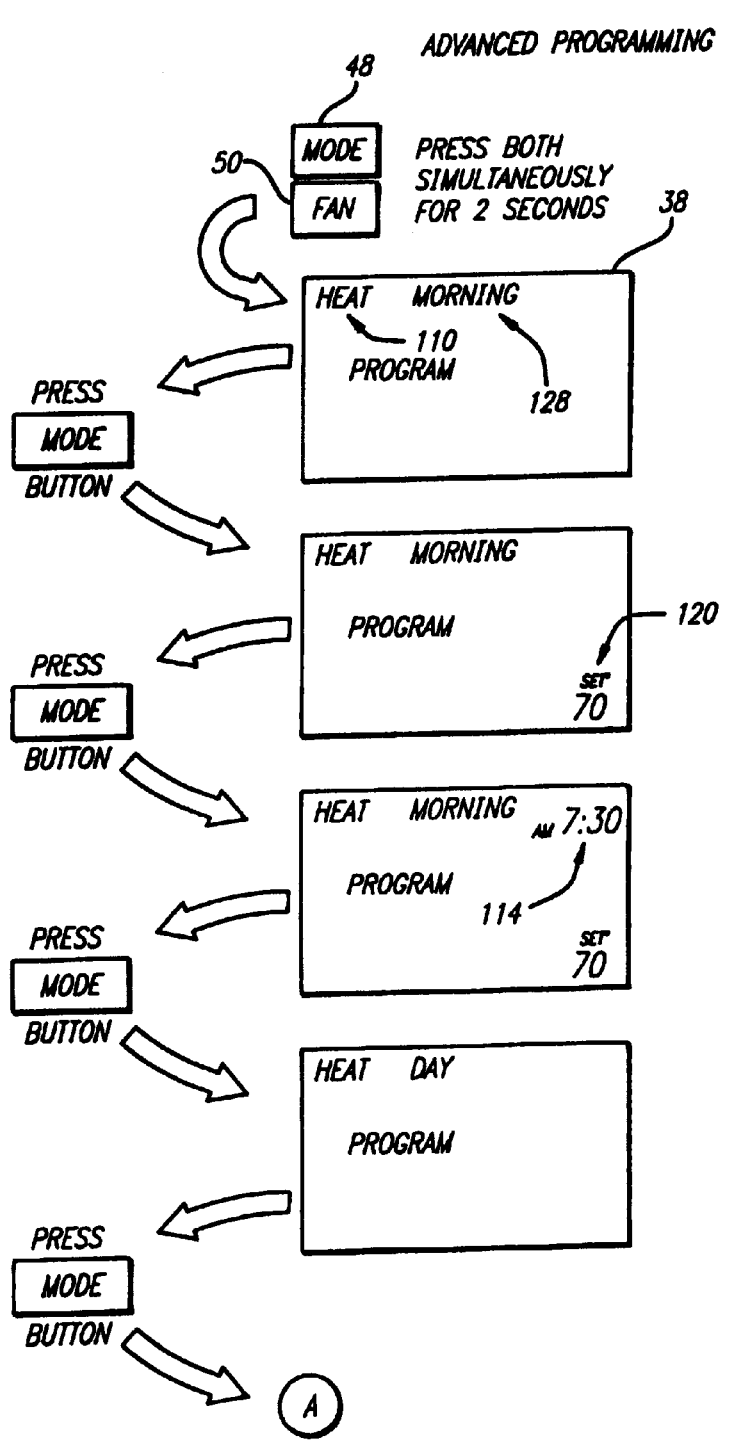
Figure 10B:
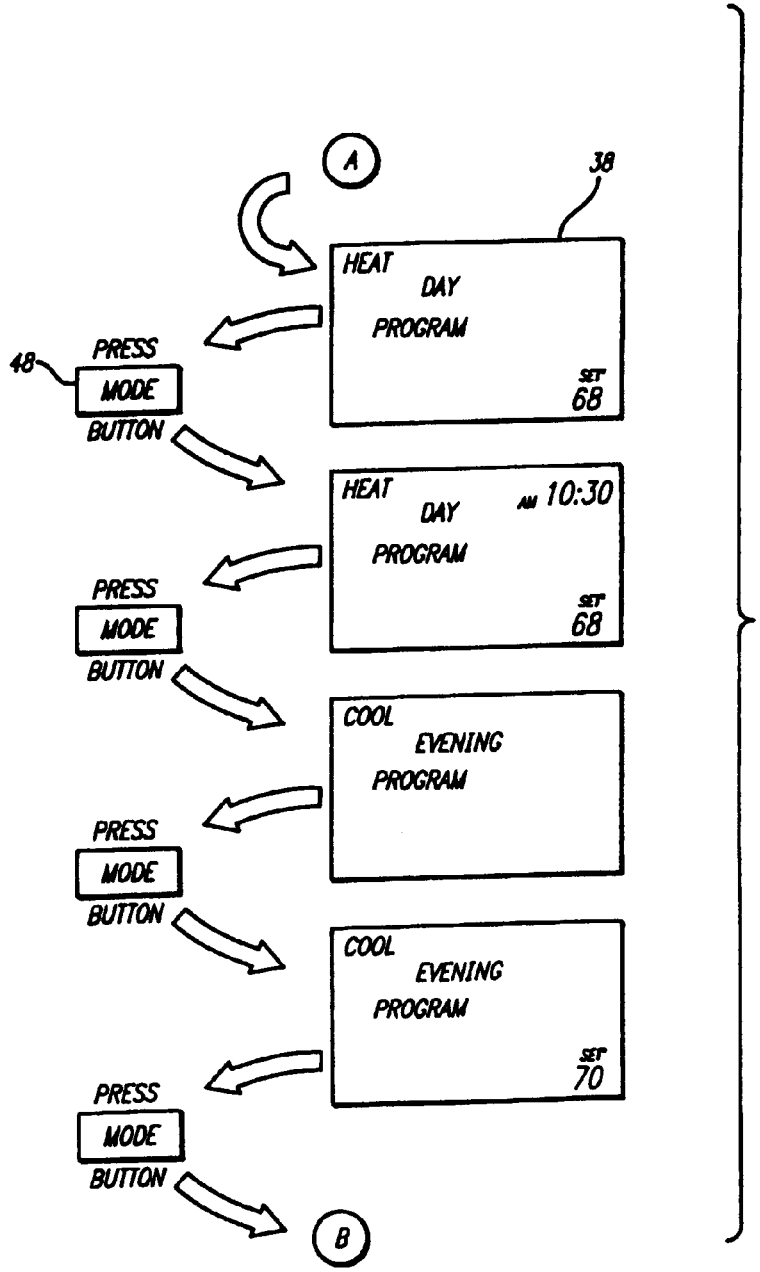

FIGS. 10A–10C show the display 38 of the programmable thermostat during execution of an advanced programming mode software module by the microprocessor 54. The advanced programming mode offers a user friendly, interactive display which serves to simplify an otherwise potentially confusing programming task. More specifically, the advanced programming mode provides a "multiple time period" programming feature. In the illustrated exemplary embodiment, the multiple time periods comprise morning, day, evening and night. Sub-fields of the timer period indication display field 128 are selectively activated depending which step of the advanced programming mode software module is currently being executed.

Referring to FIG. 10A, the up and down buttons 44, 46 are first employed by the user to select between one of the HEAT and COOL operating modes for use during the morning time period. The HEAT operating mode is shown as selected by illumination of the HEAT sub-field within the mode is entered for the morning time period, the advanced programming mode software module provides control signals to the display 38 to present the user with interactive displays which show a morning set temperature within the desired set temperature display field 120 and a morning start time within the clock display field 114. The user adjusts the morning set temperature and the morning start time as desired. Operating modes, set temperatures and start times for the day, evening and night time periods are thereafter entered by the user in response to substantially identical sequences of user prompts provided at the display 38. To return to normal operation, the user presses the down button 46 and the mode button 48 simultaneously for a predetermined period of time.

The microprocessor U1 of the programmable thermostat generates and manipulates a variety of control variables associated with each of the programming modes and, preferably, is programmed to facilitate automatic adjustments in the control variables as appropriate. For example, various timers are implemented to generate the control signals while the thermostat system is operating in the AUTO operating mode. Also, control variables relating to a desired operating mode need to be periodically updated when time period programming has been activated. By way of example and not of limitation, the programmable thermostats each weigh only a few ounces, and less than a pound, and may have dimensions such as 5 inches by 3 inches by 1½ inches or less.

It has been described above that a relatively extensive set of program parameters may be stepwise input by a user to a programmable thermostat and wirelessly transmitted to a controller device. The effort to duplicate this effort at a plurality of control devices in an industrial installation is critical although, with the devices of the prior art, takes substantial time and is filled with potential for by mistake or intentionally allowing different settings in different control device locations. Energy savings in balance with personnel comfort are most easily planned when the same control program and parameters are used where needed.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. A system of battery operated remote temperature sensing transmitters, receiver means and a programmable thermostat comprising:

(a) each battery operated remote temperature sensing transmitter comprising temperature sensing means, power supplied solely by a battery power supply, sensed temperature storage means and transmission means whereby a sensed temperature is stored and the value transmitted periodically such that battery operation of the transmitter is capable of being maintained without battery replacement for at least several months;

(b) receiver means for receiving and uniquely identifying and storing transmitted temperatures from one or more transmitters; and (c) programmable thermostat means connected operatively with the receiver means whereby sensed temperatures stored in the receiver means are retrieveable by the programmable thermostat means for use by one or more functions of the programmable thermostat means.

2. The system of claim 1 wherein each transmitter further comprises means for transmitting a unit code before transmission of a sensed temperature, which unit code uniquely identifies the transmission of a single transmitter among a plurality of transmitters transmitting to the receiver means, whereby receiver means may uniquely store the transmitted sensed temperature identified to that single transmitter.

3. The system of claim 2 wherein the unit code is settable by a user with switch means at each transmitter.

4. The system of claim 2 wherein each sensed temperature stored in the receiver means is capable of being displayed on the display screen of the programmable thermostat by use of user action interface means.

5. The system of claim 2 wherein an average of sensed temperatures stored in receiver means are transmitted to the programmable thermostat for comparison to control setpoints and other comparison functions whereby one or more environmental control equipment means are operated by the programmable thermostat.

6. The system of claim 2 wherein receiver means further comprises one or more actuatable light means whereby receipt of transmission of a sensed temperature from a transmitter causes the lights means to become lighted, further comprising means for a regular arrangement of the light means in an identifiable physical sequence such that each light means becomes lighted only upon receipt of transmission of a transmitter transmitting a matching one of the several unit codes, whereby a user may view a confirmation of receipt of the transmission from the matching unit code transmitter.

7. The system of claim 2 wherein transmitters further comprise time interval means for a user to set non-transmission periods between transmission of sensed temperatures.

8. The system of claim 7 wherein time interval means permit the user to set a non-transmission period for at least a fast response period of about 1 to 3 minutes and a slow response period of from about 4 to 9 minutes.

9. The system of claim 2 wherein each transmitter further comprises means for transmitting a house code before transmission of the unit code, which house code uniquely identifies the transmission of a single transmitter among a plurality of receiver means receiving transmitter transmissions within a common zone of potential reception the plurality of receiver means, whereby each receiver means may uniquely receive only sensed temperature transmissions from transmitters having an identically set house code.

10. A system of remote temperature sensing transmitters, receiver means and a programmable thermostat comprising:

(a) each remote temperature sensing transmitter comprising temperature sensing means, power supplied solely by a battery power supply, sensed temperature storage means and transmission means whereby a sensed temperature is stored and the value transmitted periodically;

(b) receiver means for receiving and uniquely identifying and storing transmitted temperatures from one or more transmitters; and (c) programmable thermostat means connected operatively with the receiver means whereby sensed temperatures stored in the receiver means are retrieveable by the programmable thermostat means for use by one or more functions of the programmable thermostat means.

11. The system of claim 10 wherein (d) each transmitter further comprises means for transmitting a unit code before transmission of a sensed temperature, which unit code uniquely identifies the transmission of a single transmitter among a plurality of transmitters transmitting to the receiver means, whereby receiver means may uniquely store the transmitted sensed temperature identified to that single transmitter; and (e) each transmitter further comprises means for transmitting a house code before transmission of the unit code, which house code uniquely identifies the transmission of a single transmitter among a plurality of receiver means receiving transmitter transmissions within a common zone of potential reception the plurality of receiver means, whereby each receiver means may uniquely receive only sensed temperature transmissions from transmitters having an identically set house code.

12. The system of claim 11 wherein the unit code is settable by a user with switch means at each transmitter.

13. The system of claim 11 wherein each sensed temperature stored in the receiver means is capable of being displayed on the display screen of the programmable thermostat by use of user action interface means.

14. The system of claim 11 wherein an average of sensed temperatures stored in receiver means are transmitted to the programmable thermostat for comparison to control setpoints and other comparison functions whereby one or more environmental control equipment means are operated by the programmable thermostat.

15. The system of claim 11 wherein receiver means further comprises one or more actuatable light means whereby receipt of transmission of a sensed temperature from a transmitter causes the lights means to become lighted, further comprising means for a regular arrangement of the light means in an identifiable physical sequence such that each light means becomes lighted only upon receipt of transmission of a transmitter transmitting a matching one of the several unit codes, whereby a user may view a confirmation of receipt of the transmission from the matching unit code transmitter.

16. The system of claim 11 wherein transmitters further comprise time interval means for a user to set non-transmission periods between transmission of sensed temperatures.

17. The system of claim 16 wherein time interval means permit the user to set a non-transmission period for at least a fast response period of about 1 to 3 minutes and a slow response period of from about 4 to 9 minutes.

\* \* \* \* \*